Jan. 6, 1942.                    G. MATTERSDORF                    2,268,605
                                  FRICTION BRAKE
                                Filed Sept. 1, 1939                6 Sheets-Sheet 1
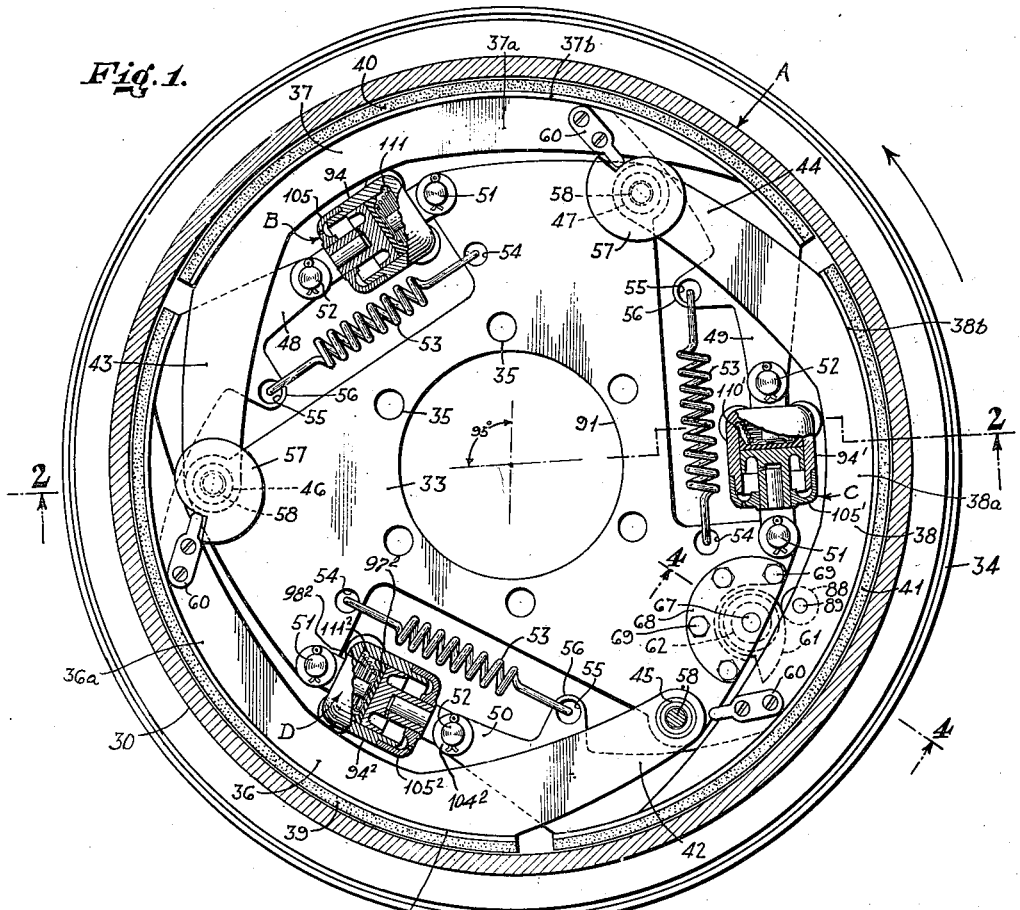
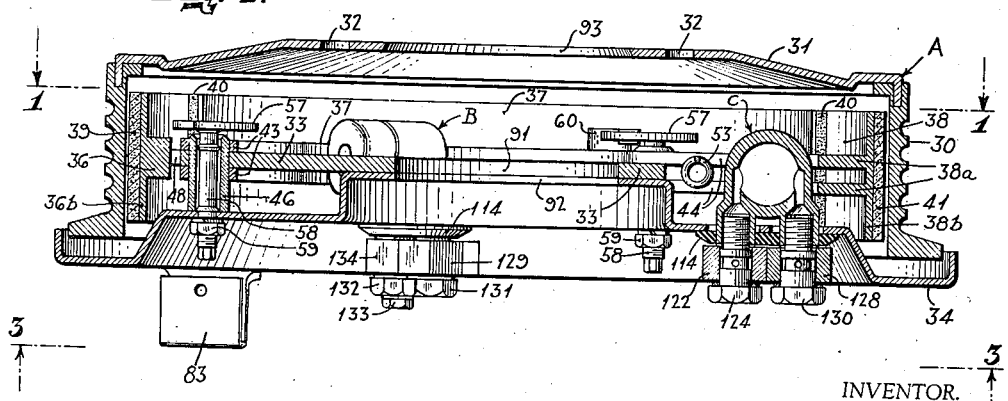
INVENTOR.
GUSTAV MATTERSDORF
BY Harry Price
ATTORNEY.

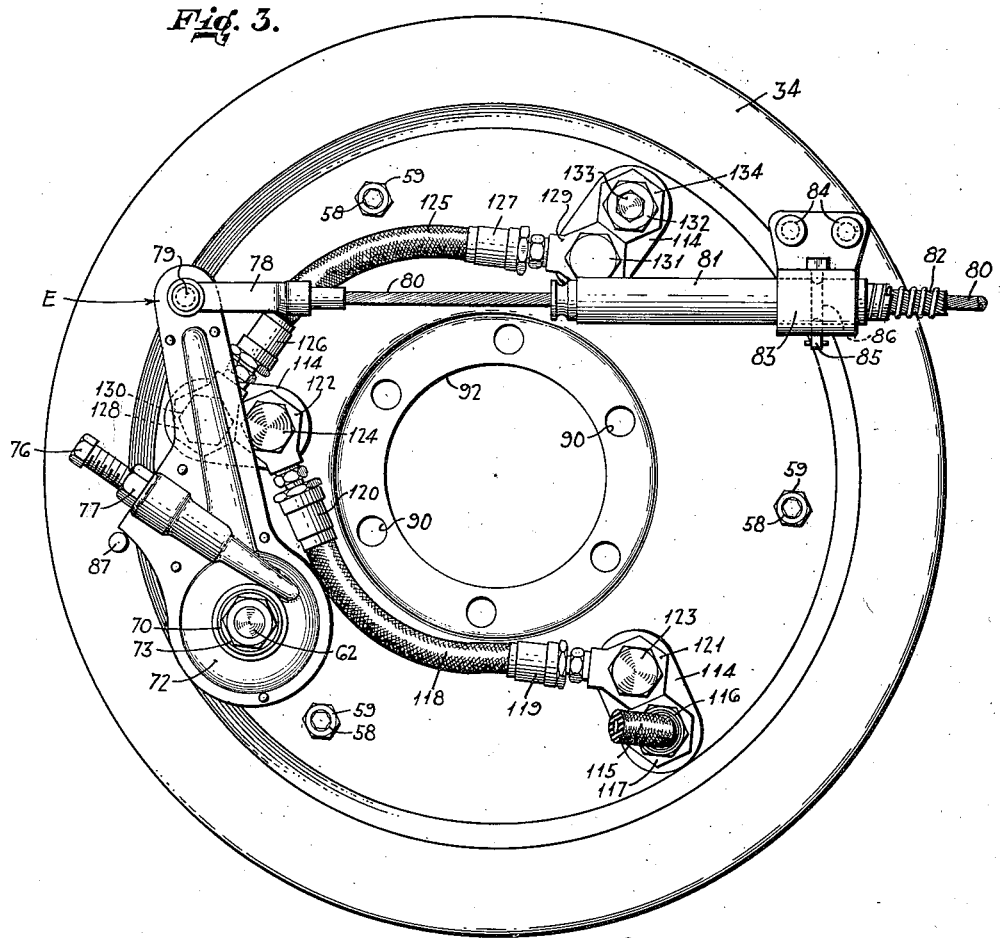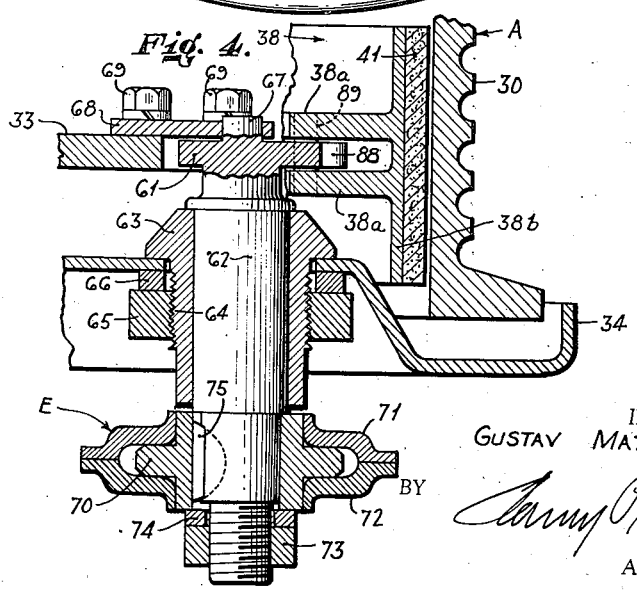

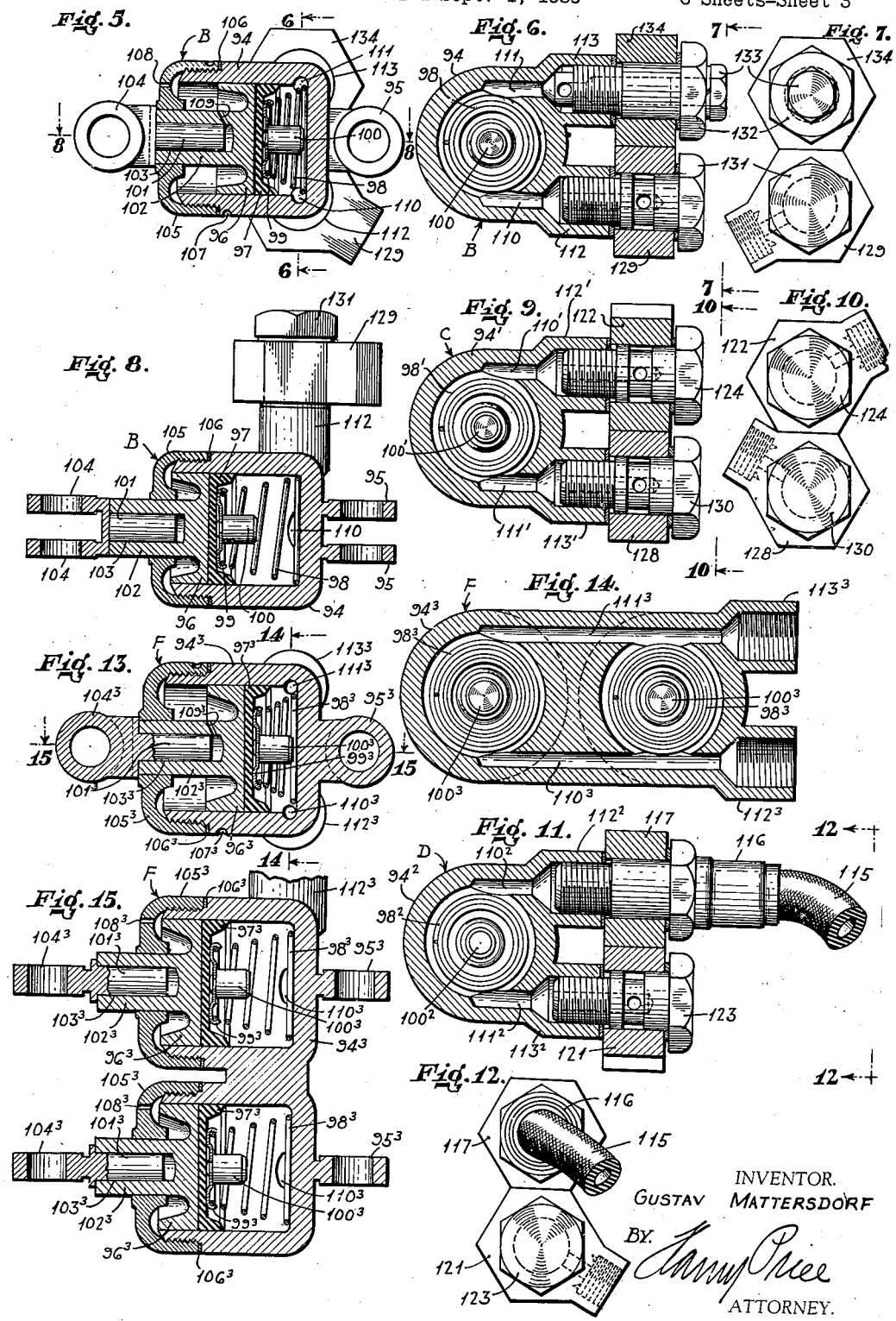

INVENTOR.
GUSTAV MATTERSDORF
BY
ATTORNEY.

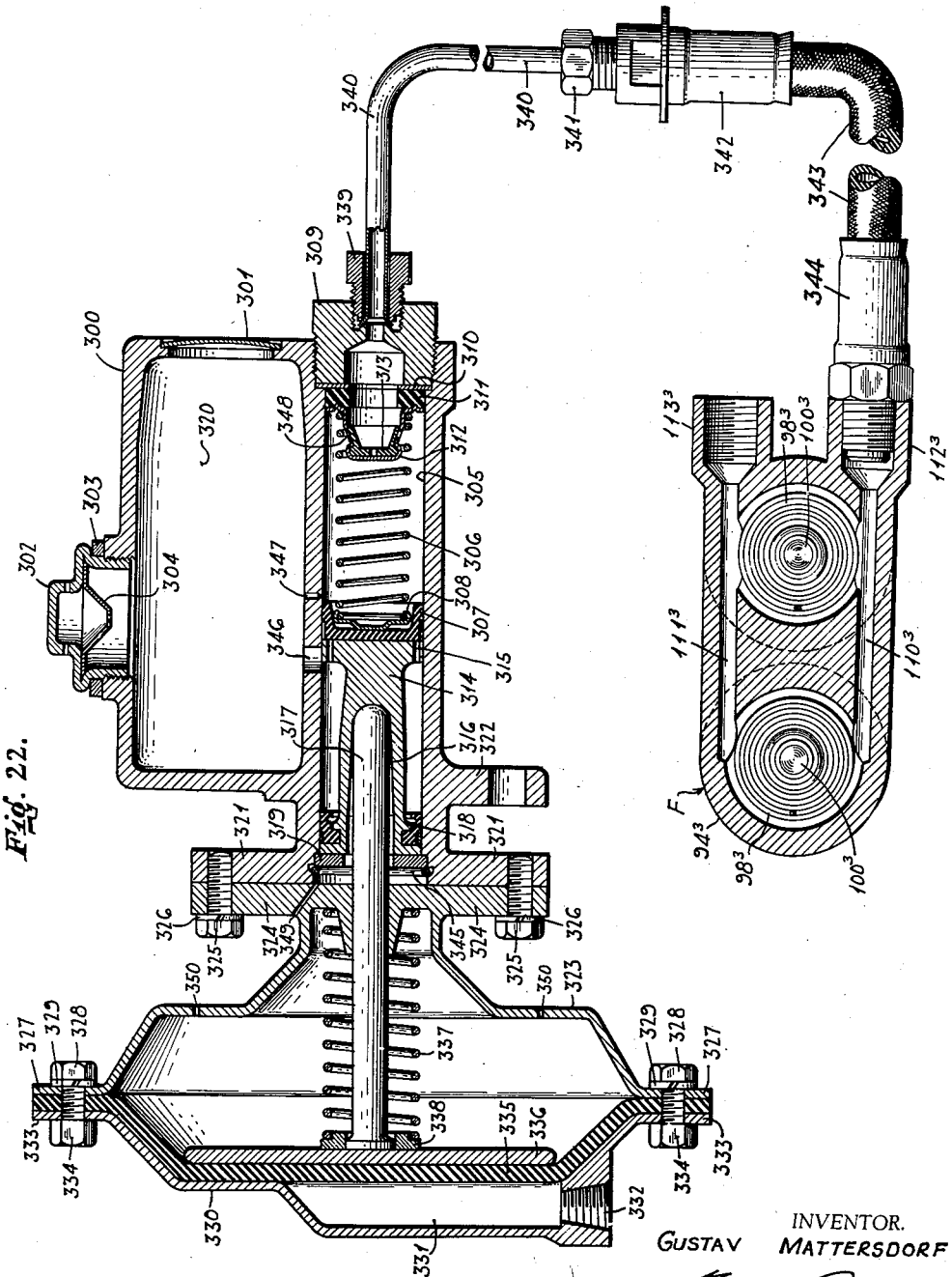

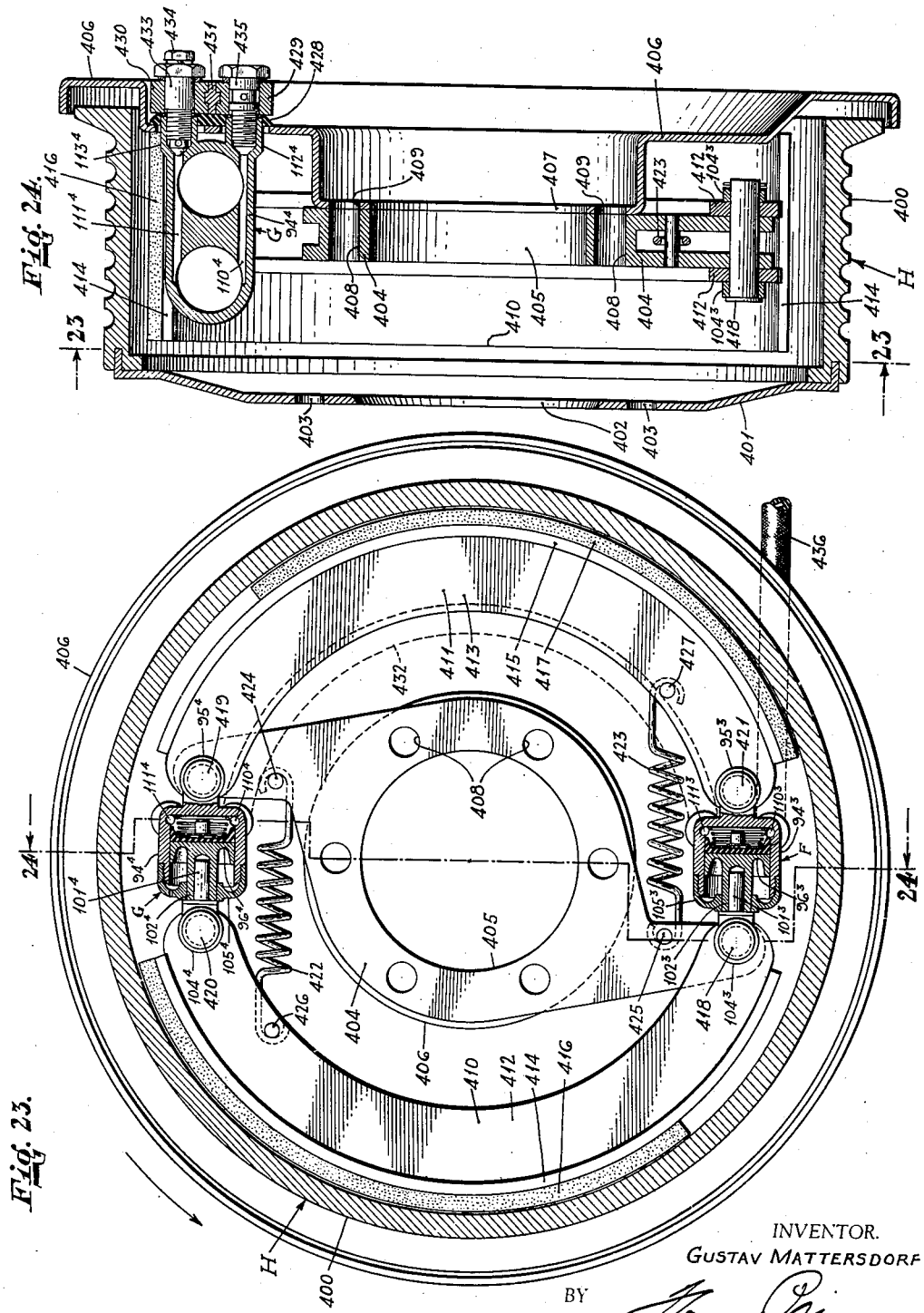

Patented Jan. 6, 1942

2,268,605

UNITED STATES PATENT OFFICE 2,268,605

FRICTION BRAKE

Gustav Mattersdorf, Lawrence, N. Y.

Application September 1, 1939, Serial No. 293,021

20 Claims. (Cl. 188—152)

This invention relates to friction brakes.

Although this invention will be illustratively described in its application to hydraulically or liquid pressure operated internal brakes for automotive vehicles, certain features herein presented are applicable as well to other types of brakes.

In hydraulic brakes, when using an hydraulically operated actuating motor or wheel cylinder to operate the shoe or shoes, although not essential, it is preferable to remove from the liquid system all or as much of the air as possible. The presence of the air in the system frequently tends to make the brakes feel "springy" or "spongy" on application, and necessitates a larger master cylinder and a larger pedal stroke, the extra motion being employed to compress the air in the system.

The removal of air may be accomplished for example by an exhaust pump, or better by "bleeding." Where only one horizontally disposed single or double wheel cylinder is employed as for a two shoe brake, an air outlet may readily be provided at the top of the wheel cylinder. But in using three or more independently operated brake shoes in the same circumferential path, however, a more difficult problem is presented, since the actuating motors are arranged at different levels and in different axial positions.

One of the objects of this invention, therefore, is to provide a multi-shoe liquid pressure or hydraulically operated brake wherein the air may be removed from the system with facility, and without unduly increasing the expense of the construction.

In accomplishing this object it has been found desirable to construct a ported motor assembly or cylinder-piston combination so that a port will be located at the highest point of such cylinder or the liquid chamber therein regardless of the angle at which it may be necessary to place the cylinder. Desirably each said assembly is reversible and may be pivotally mounted at each end.

In these assemblies it has been found most desirable to place the ports at diametrically opposite points in the cylinder adjacent or at the closed end thereof and then to arrange these assemblies so that the ports or openings into the liquid chamber will lie substantially in a vertical plane.

A further difficulty frequently arises because of the limitations on the pressure which may be applied to the hoses and other parts of the conduit system—which in turn limits the braking force.

It is not readily possible to increase the diameter of the motor assemblies indefinitely because of limited drum and wheel diameters.

It is therefore a further object of the present invention to provide a brake construction which will permit increase in braking torque without unduly increasing the motor assembly diameter and within the space limitations of the available wheel and drum sizes.

In accomplishing this object it has been found satisfactory to position two or more cylinder-piston combinations or motor assemblies side by side, with a corresponding increase in braking force for the same or even less liquid pressure.

Still further objects and advantages will appear from the more detailed description set forth below, it being understood, however, that this more detailed description is given by way of illustration, since various changes therein may be made by those skilled in the art without departing from the scope and spirit of the invention.

Referring to the drawings, which illustrate several of the various possible embodiments of the present invention, but to which the present invention is by no means restricted, since the drawings are merely by way of illustration and not by way of limitation:

Fig. 1 is a vertical side elevation, partly in section, of a three shoe brake mechanism illustrating one embodiment of my invention along the line 1—1 of Fig. 2.

Fig. 2 is a transverse section, along line 2—2 of Fig. 1, with some of the parts omitted for the sake of clarity.

Fig. 3 is a vertical inside elevation from the line 3—3 of Fig. 2 showing the back of the embodiment portrayed in Fig. 1.

Fig. 4 is a fragmentary section on a larger scale as compared to Fig. 1 along the line 4—4 of Fig. 1.

Fig. 5 shows the section on an enlarged scale as compared to Fig. 1 of the uppermost hydraulic actuating assembly of Fig. 1, in a fully collapsed position.

Fig. 6 is a transverse section along line 6—6 of Fig. 5.

Fig. 7 is a side elevation from line 7—7 of Fig. 6, showing the bolts and fittings only, the cylinders having been omitted.

Fig. 8 is a section along line 8—8 of Fig. 5 showing the motor assembly in an extended position.

Fig. 9 is a transverse section similar to Fig. 6 of the right-hand motor assembly of Fig. 1.

Fig. 10 is a side elevation from line 10—10 of

Fig. 9, showing the bolts and fittings only, the cylinder itself having been omitted.

Fig. 11 is a transverse section similar to Figs. 6 and 9 of the lowermost motor assembly of Fig. 1.

Fig. 12 is a side elevation along line 12—12 of Fig. 11, showing the bolt, hose, hose coupling and fittings only, the motor assembly or cylinder-piston combination itself having been omitted.

Fig. 13 is a vertical longitudinal section of a modified form of brake shoe actuating assembly in fully closed position.

Fig. 14 is a transverse section along line 14—14 of Fig. 13.

Fig. 15 is a transverse section along line 15—15 of Fig. 13 showing the motor assembly in an expanded position.

Figure 16:
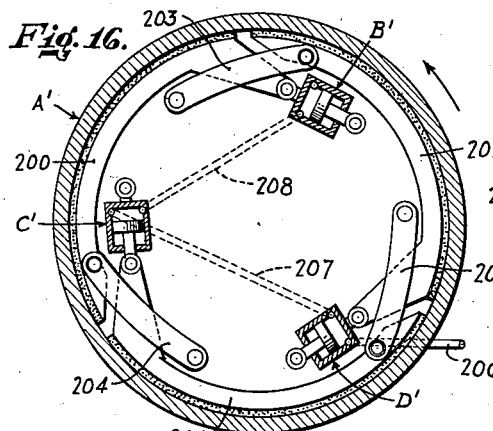

Fig. 16 is a diagrammatic elevation, partly in section, of another embodiment of my invention showing three self-actuated or assisted shoes.

Figure 17:
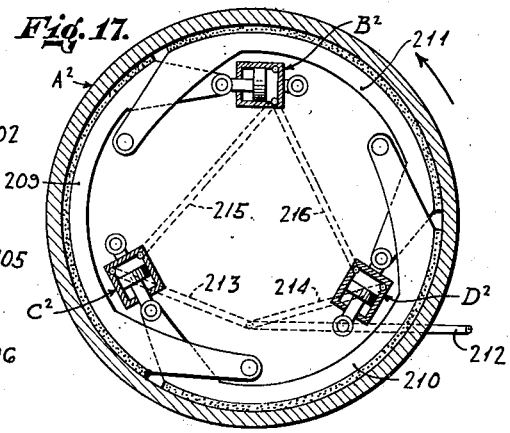

Fig. 17 is a diagrammatic elevation, partly in section, of still another embodiment of my invention.

Figure 18:
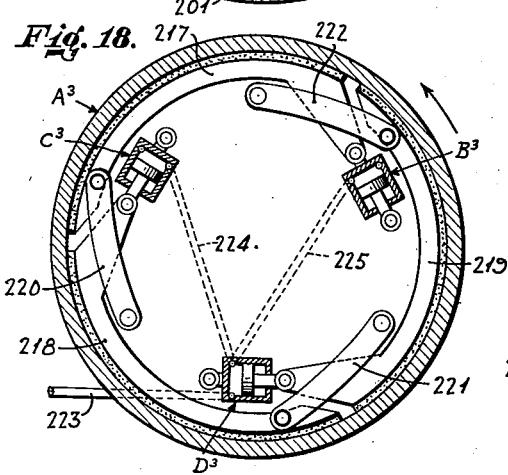

Fig. 18 is a diagrammatic elevation, partly in section, of a further embodiment of my invention.

Figure 19:
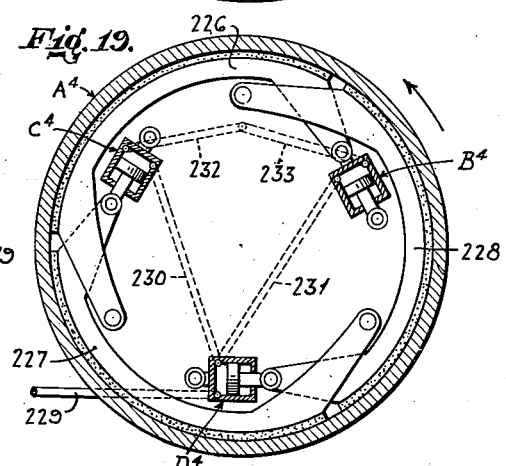

Fig. 19 is a diagrammatic elevation, partly in section, of a modification of the embodiment illustrated in Fig. 18.

Figure 20:
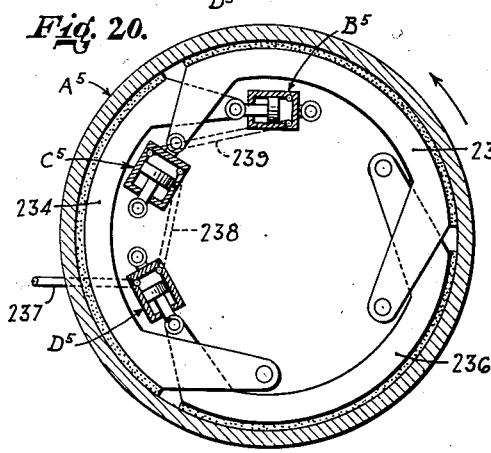

Fig. 20 is a diagrammatic elevation, partly in section, of an embodiment of my invention as applied to a three shoe brake in which two of the shoes are assisted and one opposed.

Figure 21:
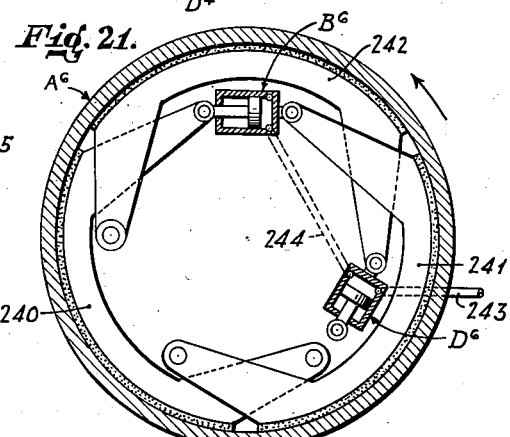

Fig. 21 is a diagrammatic elevation, partly in section, of a modification of the embodiment portrayed in Fig. 20.

Fig. 22 is a sectional view of a master cylinder assembly operating a brake shoe motor assembly such as shown in Figs. 13, 14 and 15.

Fig. 23 is a vertical side elevation, partly in section, of a brake mechanism illustrating another embodiment of my invention employing the modified form of brake shoe actuating assemblies illustrated in Figs. 13, 14 and 15, and is along line 23—23 of Fig. 24, and Fig. 24 is a vertical transverse section along the line 24—24 of Fig. 23.

In Figs. 1, 16, 17, 18, 19, 20, 21 and 23, the arrows concentric with the drums indicate the direction of rotation of the drums corresponding to forward motion.

In Figs. 1, 2 and 4, inclusive: A is a brake drum comprising a braking flange 30 and, securely attached thereto, a web 31 containing a central opening 93 and holes 32 for attachment to a wheel, hub, axle or other part of a vehicle or machine to be braked. A relatively fixed brake support member or torque plate 33 containing central opening 91 and the brake backing plate 34 having central opening 92 are securely attached by bolts, rivets or suitable fasteners (not shown) to the axle housing, brake spider or other fixed part (not shown) through holes 35 and 90.

Three brake shoes, 36, 37 and 38 have double stems or webs 36a, 37a and 38a and flanges or soles 36b, 37b and 38b to which latter are securely attached the lining or friction members 39, 40 and 41, respectively. These shoes as shown are all frictionally assisted or self-actuated in forward motion.

The shoes have heel connections 42, 43 and 44 being extensions of the shoe stems and comprising two parallel arms the ends of which away from the shoe body straddle the torque plate (see Fig. 2). Such heel extensions or connections are anchored or pivotally connected to the torque plate 33 by hollow anchor pins 45, 46 and 47 (see Fig. 2).

The shoes 36, 37 and 38 also have toe extensions 48, 49 and 50 respectively, which are disposed centrally of the webs and extend beyond the toe ends of the contact surfaces of the respective shoes and lie between the heel extensions or connections 43, 44 and 42 of the respective adjacent shoes. The hydraulically operated brake shoe actuating or motor assemblies or cylinder-piston combinations B, C and D are pivotally connected at one end to the torque plate 33 by studs 51 and at the other end to the respective toe connections of the shoes 36, 37 and 38 by studs 52.

The three retractor springs 53 are connected at one end to the torque plate through holes 54 and at the other ends to their respective shoes by holes 55 in the projections 56.

Clearance adjustment cams 57 are secured to respective shafts 58 the lowermost cam being omitted in Fig. 1 to more clearly show the shaft 58. These shafts pass through the respective hollow anchor pins 45, 46 and 47 and through holes in the backing plate as shown in Fig. 2.

Each of these shafts has a shoulder which abuts against the inner edges of the backing plate hole and an extension which protrudes through this hole. These shaft extensions are threaded to receive the respective lock nuts 59 and their accompanying lock washers by which these shafts and their respective cams are fixed in position. The extreme ends of these cam shaft extensions have hexagonal heads or ends to permit the shafts and their respective cams to be rotated to any desired position.

Cam rests 60 are secured to shoes 36, 37 and 38. The cams 57 and cam rests 60 serve to limit the motion and fix the position of the shoes when no actuating force is applied and provide for adjustment as required from time to time as the lining wears.

The hollow anchor pins 45, 46 and 47 have beveled or pointed edges at their ends away from the backing plate.

The shafts 58 have beveled bearing projections where they contact the interior surfaces of the anchor pins.

Since the parts of motor assemblies B, C and D are similar (see Figs. 5 to 12), they are referred to by similar reference numbers except that for assembly C these reference numbers are primed and for assembly D, the reference numbers contain the superior numeral "2."

Each of the actuating assemblies B, C and D has a cylinder or a casing 94 with a cylindrical bore, an open end and a closed end. Adjacent the closed end, each casing has two ports 110 and 111 which are substantially diametrically opposite each other as shown, and port extensions 112 and 113, the purpose of the ports being to permit the flow of liquid into and out of the casing.

To the closed end of the casing 94 is attached an eyed yoke 95. Within the casing bore is a piston 96 and disposed between the piston and the closed end of the casing is a rubber sealing cup 97 to prevent leakage of fluid. The sealing cup 97 is held against the piston 96 by the spring 98 disposed between the closed end of the casing and the cupped portion of the sealing cup. This spring 98 is substantially less powerful than either of the retractor springs 53 and may be overcome by the latter.

The piston end of the spring 98 rests in spring cup 99 to which is secured as by a rivet inwardly extending stop pin 100 the purpose of which is to limit the inward motion of the piston and thereby to prevent the ports 110 and 111 from being closed off or covered by the cup 97.

The piston 96 has an outward extension of substantially smaller diameter in the form of piston rod 102, which has a cylindrical bore 103 coaxial with the casing bore and open at the end away from the piston.

Surrounding and supporting the piston rod 102 and mounted on the outer threaded end of the casing adjacent its open end is a metal bearing and dust cap 105 having a centrally located bore of substantially the same diameter as the piston rod, thereby serving as a support or bearing for the latter. The cap is secured to the casing by lock washer 106. Spanner holes 107 are provided for tightening the cap 105 to the casing 94.

The cap 105 has a vent 108, to permit the ready passage of air into and out of the otherwise closed space between the piston and the cap.

Inserted into the position rod bore 103 and adapted for sliding motion therein, is link rod 101 to the outer end of which is connected the eyed yoke 104. The piston rod 102 has a vent 109 to permit the ready passage of air into and out of the piston rod bore 103.

In the fully closed position of the motor assembly as shown in Fig. 5, the link rod yoke 104 rests against the bearing cap 105 limiting its inward motion. The link rod yoke 104 also normally rests against the end of the piston rod 102. On applying the brakes, the force on the piston 96 is communicated through the piston rod to the link rod yoke 104 as the latter abuts the end of the piston rod, as shown.

On the motor assemblies B and D (see Fig. 1), the casing yokes are pivotally attached to the torque plate 33 by studs 51 passing through the yoke eyes and torque plate, as shown, the studs 51 being held in place by cotter pins or other suitable means. On these same motor assemblies B and D, the piston ends are pivotally connected to the respective shoes 36 and 38 by studs 52 passing through the respective link rod yoke eyes and the shoe toe extensions 48 and 50. These studs are likewise held in place by suitable means such as cotter pins.

On motor assembly C, however, the position is reversed, the casing yoke being pivotally connected to the toe extension 49 of shoe 37 by stud 52 held in place by a cotter pin or other suitable means and the piston end pivotally connected to the torque plate 33 by stud 51 passing through the link rod yoke and the torque plate, this stud likewise being secured by suitable means as by a cotter pin.

The purpose of this arrangement is to provide in each motor assembly a port at the highest part of each cylinder to facilitate the removal of air and to prevent the confining of air or the formation of air locks.

As a further means to accomplish this and in addition to reversing the position of the motor assembly C it should be noted that I prefer to have the axis of motor assembly C not quite vertical. Thus, I have turned the whole mechanism to a slight angle so that one port of motor C will be higher than the other. As shown, I prefer to have each motor assembly have an upper and a lower port, the upper port in each case being at the highest position of the fluid chamber.

The motor assembly port extensions 112, 112$^1$ and 112$^2$ and 113, 113$^1$ and 113$^2$ (see Figs. 6, 9 and 11) protrude through the backing plate 34. Rubber dust caps 114 (see Fig. 2) fit over the protruding portions of these extensions to cover the backing plate holes to prevent the entrance of dirt and water.

The liquid supply hose (see Fig. 3) leading from the master cylinder is connected by threaded coupling 116, to the lower port 110$^2$ of motor assembly D (see Fig. 11). The port 110$^2$ is shown in somewhat changed position in Fig. 11 for purposes of clearer illustration, in order that this figure may show assembly D in a position similar to assembly B in Fig. 6.

Disposed between the hexagonal projection on coupling 116 and the port extension 112$^2$ is the bored hexagonal dummy fitting 117 through the bore of which the coupling passes.

The flexible hose 118 (see Fig. 3) connects the upper port 111$^2$ (see Fig. 11) of motor assembly D with the lower port 110$^1$ of motor assembly C (see Fig. 9) by swivel couplings 119 and 120, fittings 121 and 122, and fitting bolts 123 and 124. In Fig. 9, the port 110$^1$ is shown above the port 111$^1$ for clearer illustration in order that this figure may show assembly C in a position similar to assembly B in Fig. 6.

The flexible hose 125 (see Fig. 3) consists the upper port 111$^1$ (see Fig. 9) of motor assembly C with the lower port 110 (see Fig. 6) of the uppermost motor assembly B by swivel couplings 126 and 127, fittings 128 and 129 and fitting bolts 130 and 131.

The upper port 111 of motor assembly B (see Figs. 3 and 6) is normally plugged up by the threaded bleeder plug 132 which is tightly seated against sloping shoulders within the port extension 113. The plug 132 is solid at the inner end and has a transverse hole which connects with a longitudinal bore a portion of which is threaded to receive the dust screw 133. Disposed between the hexagonal head of the bleeder plug and the edges of port extension 113 is the bored hexagonal dummy fitting 134 through the bore of which the bleeder plug 132 passes. The inner and outer faces of fitting 134 are provided with compressible felt washers (as shown) to keep this fitting from rattling. The inner and outer faces of all the other fittings (117, 121, 122, 128 and 129) are provided with gaskets (as shown) to prevent leakage of fluid.

To remove the air from the system, the dust screw 133 is removed and a bleeder hose inserted. The bleeder plug is loosened, opening the port 111. The liquid is forced or pumped through the system and other cylinders C and D forcing the air out through the bleeder port 111. When all of the air and air bubbles have been removed, the port extension 113 is closed by tightening the plug 132.

It should be noted that each motor assembly has the exit port at the highest point of the fluid chamber of each such assembly (see Figs. 1 and 3).

It will be seen that the fittings 117 and 121, 122 and 128, and 129 and 134 have surfaces which abut each other to prevent the fittings from turning. Only two different types of fittings are required, one a hexagonal dummy fitting which can be used either for fitting 117 or fitting 134, and the other a substantially hexagonal fitting having a projection which can be used interchangeably for any of the four other fittings.

It will be seen that through the various hoses, fittings and connections, the various motor assemblies are interconnected, to function simultaneously.

Referring now particularly to Figs. 1, 2, 3 and 4: 61 is an emergency or parking brake cam integral with or securely attached to shaft 62 supported in housing or bearing 63 which is secured to backing plate 34 by lock nut 65 and lock washer 66 secured to projection 64 protruding through a hole provided in the backing plate. As a further internal support or bearing, cylindrical projection 67 is provided which is supported by bearing plate 68 secured to torque plate 33 by bolts 69. Keyed to the outer end of shaft 62 by key 75 and for turning the shaft and cam is brake lever E containing an inner cover 71 and an outer cover 72 and a bearing collar 70 secured to the shaft by retaining nut 73 and lock washer 74.

To adjust the position of the lever with respect to the shaft, adjusting screw 76 and lock nut 77 are provided. Secured to the end of lever E by clevis pin 79 is clevis 78 which is connected to brake cable 80 contained in cable housing 81 and conduit 82.

Supporting the housing 81 (see Fig. 3) is bracket 83 attached to backing plate 34, by rivets 84. Passing vertically through holes in the horizontal portions of the bracket 83 and near the backing plate is pin 85 which engages with a groove 86 in the housing 81 to prevent longitudinal motion in said housing and the conduit 82 attached thereto, the cable being free to move longitudinally within said housing and conduit. Secured to backing plate 34 is stop pin 87 which limits the rearward motion of lever E.

Engaging cam 61 is roller 88 (see Fig. 1) disposed between the parallel webs 38a of shoe 38 (see Fig. 4) and mounted on pin 89 passing through such webs.

The lever E through cable 80 may be operated by a hand brake lever (not shown). The motion of the lever E is communicated to the shaft 62 and cam 61, thereby—through the medium of roller 88 and pin 89—forcing shoe 38 into contact with the drum. This arrangement serves as an auxiliary brake operating mechanism for parking purposes or in the event of failure of the hydraulic pressure system. Only one shoe of the brake is thus separately operable. Since the shoe 38 will generally only be applied by this arrangement when the car is parked or still, the wear on shoe 38 will not be appreciably greater than on shoes 36 and 37.

It will be seen that when the auxiliary brake mechanism is quickly applied, the link rod yoke 104² is pulled away from the piston and the motion followed up by the piston through the medium of spring 98² until the piston rod meets the link rod yoke 104². The additional fluid required is provided by the compensating mechanism in the master cylinder. If this yoke were securely fastened to the piston or piston rod instead of being adapted for sliding motion, the piston itself during quick application of the auxiliary mechanism would be pulled out in some instances too quickly to permit sufficient time for displacement by additional liquid from the main fluid reservoir through the compensating mechanism which might result in air passing the sealing cup 97² and entering the fluid chamber.

Referring to Fig. 3, it will be noted that the flexible connecting hoses 118 and 125 are parallel to the backing plate 34 and are disposed within a recessed portion of said backing plate to protect them against damage.

Figs. 13, 14 and 15 illustrate a modified form of shoe actuating assembly F with a double cylinder, similarly functioning parts to those shown in Figs. 5, 6 and 8, being identified by the same reference characters with superior numbers "3."

The casing 94³ has two parallel cylindrical bores with open ends and common closed ends. Adjacent the closed ends are two diametrically opposed fluid ports 110³ and 111³ connecting both bores, as shown, and respective port extensions 112³ and 113³. To the closed end of the casing 94³ are attached a pair of eyed attachment lugs 95³.

Pistons 96³ are provided for reciprocal motion in the bores. Against the backs of the pistons 96³ are placed resilient or rubber sealing cups 97³ to prevent leakage of fluid. The sealing cups 97³ are held against the pistons by compression springs 98³ disposed between the cups and the closed ends of the bores.

The piston ends of the springs 98³ rest in spring cups 99³ to which are attached inwardly extending stop pins 100³ to limit the inward motion of the pistons 96³, thereby preventing closure of the ports 110³ and 111³ by the cups 97³.

The pistons 96³ have outward extensions of substantially smaller diameter in the form of piston rods 102³, the latter having cylindrical bores 103³ coaxial with the casing bores and open at the ends away from the pistons 96³.

Surrounding and supporting the piston rods 102³ and mounted on the outer open threaded ends of the casing 94³ are metal or rigid bearing and dust caps 105³ having centrally located holes or bores of substantially the same diameter as the piston rods 102³, thereby serving as supports or bearings for the latter and permitting the piston rods to slide inwardly and outwardly.

The caps 105³ are secured by lock washers 106³. Spanner holes 107³ are provided for tightening the caps 105³ to the casing 94³. The caps 105³ have vents 108³ to permit the ready passage of air into and out of the otherwise closed space between the pistons 96³ and the caps 105³.

Inserted into the piston rod bores 103³ for sliding motion therein, are link rods 101³ to the outer ends of which are secured eyed attachment lugs 104³. The piston rods 102³ have vents 109³ to permit the ready passage of air into and out of the piston rod bores 103³.

In the fully collapsed position of the assembly as shown in Fig. 13, the link rod attachment lugs 104³ abut the bearing caps 105³. The lugs 104³ also normally abut the ends of the piston rods 102³. On applying the brakes, the force on the pistons 96³ is communicated through the piston rods 102³ to the link rod lugs 104³, as shown more clearly in Fig. 15.

The modification F may be used in place of the assemblies B, C and D but is intended primarily for use with brakes having wide shoe flanges and linings, particularly in such cases where limited drum diameters prevent the use of large diameter single cylinders.

Thus, with this modification, the actuating force applied to the shoes can be doubled without requiring increase in pressure. To obtain a similar force with a single cylinder, the bore diameter of the latter would have to be increased about 40% which may be structurally impossible or undesirable, or the fluid pressure might have to be increased beyond the safety limitations of the hydraulic system.

Although two piston elements are shown in modification F, more than two could also be used.

The device of Fig. 16 represents a modification of the embodiment depicted in Fig. 1 and is intended primarily for cases where it is desirable to have the cylinder connection for the main inlet hose toward the rear of the brake.

In addition it differs in the positioning of the motor assemblies, two being reversed instead of one, and in the provision of articulated link heel connections for the shoes instead of rigid connections.

Within the brake drum A' are shoes 200, 201 and 202 anchored or pivotally connected by articulated heel links 204, 205 and 203, respectively, to a relatively fixed support (not shown) and operated respectively by hydraulic actuating assemblies B', C' and D'. The assemblies are pivotally connected at one end to their respective shoes by toe extensions and at the other end to said fixed support.

In assembly C', the piston end is connected to the shoe 201 and the casing end to said fixed support.

In the assemblies B' and D' the casing ends are connected to the shoes and the piston ends to the fixed support. Inlet hose 206 connects to the lower port of assembly D', flexible hose 207 connects the upper port of assembly D' with one of the ports of assembly C' and flexible hose 208 connects the other port of assembly C' with the lower port of assembly B'. The upper port of assembly B' is a bleeding port and is normally plugged.

The assembly C' is preferably so positioned that the port connecting with hose 208 is higher than the port connecting with hose 207. It will be noted that each of the assemblies B', C' and D' has an exit port at the highest point of the fluid chamber contained therein.

In Fig. 17 the brake drum $A^2$ contains three brake shoes 209, 210 and 211, each pivotally connected at one end to a relatively fixed part (not shown) by heel extensions, and the three actuating assemblies $B^2$, $C^2$ and $D^2$, each pivotally connected at one end to the respective shoes 209, 210 and 211, and at the other end to said fixed part.

In assemblies $B^2$ and $C^2$, the piston ends are connected to the shoes and in assembly $D^2$ the casing end is connected to the shoe. The inlet hose 212 branches into flexible hoses 213 and 214, which are connected to the lower ports of $C^2$ and $D^2$ respectively. From the upper ports of the latter, flexible hoses 215 and 216 connect to the lower port of assembly $B^2$, the upper port of which assembly serves as a bleeding port and is normally closed. In Figs. 16 and 17 all the shoes are self-actuated in forward motion.

Fig. 18 depicts another embodiment in which the brake drum $A^3$ contains brake shoes 217, 218 and 219. These shoes are anchored or pivotally connected by articulated heel links 220, 221, and 222, respectively, to a relatively fixed support member (not shown) and operated respectively by hydraulic motor assemblies $B^3$, $C^3$ and $D^3$, each of which is pivotally connected at one end to the toe connection of its respective shoe and at the other end to said fixed member.

In assemblies $C^3$ and $D^3$ the piston ends are connected to the shoes, whereas on assembly $B^3$ the casing end is connected to its shoe so that, as in the previously described embodiments, each of the assemblies have a port at the highest points of the cylinders.

Inlet hose 223 connects to the lower port of assembly $D^3$, the upper port of which is connected by flexible hoses 224 and 225 to the lower ports of assemblies $C^3$ and $B^3$ respectively. The upper ports of assemblies $B^3$ and $C^3$ serve as bleeding ports and are normally closed.

Fig. 19 depicts a modified form of the embodiment portrayed in Fig. 18 with two essential differences, namely, the use of integral heel connections or extensions instead of articulated links and the joining of the upper ports of the upper cylinder assemblies for common bleeding purposes.

In Fig. 19 the brake drum $A^4$ contains three brake shoes 226, 227 and 228, anchored or pivotally connected through heel extensions to a relatively fixed support member (not shown) and operated respectively by hydraulic actuating assemblies $B^4$, $C^4$ and $D^4$ each of which is pivotally connected at one end to said fixed member and at the other end to its associated shoe through toe extensions provided thereon.

In assemblies $C^4$ and $D^4$ the piston ends are pivotally connected to the shoes whereas in assembly $B^4$ the casing end is connected to its shoe providing for the port arrangement referred to above.

The inlet hose 229 connects to the lower port of assembly $D^4$, the upper port of which is connected by flexible tubings 230 and 231 with the lower ports of assemblies $C^4$ and $B^4$ respectively. The upper ports of assemblies $C^4$ and $B^4$ are connected by flexible tubings 232 and 233, a bleeding port, normally closed, being provided at the junction of the latter tubings, said port being preferably higher than the upper ports of assemblies $C^4$ and $B^4$.

Fig. 20 represents a further embodiment as applied to a three shoe brake in which two of the shoes are frictionally assisted and the third shoe frictionally opposed in a given direction of drum rotation.

In this figure, $A^5$ is the brake drum within which are disposed the assisted shoes 234 and 236 and the opposed shoe 235, each of which is anchored or pivotally connected through heel extensions or connections to a relatively fixed member (not shown), the shoes being operated respectively by hydraulic actuating assemblies $B^5$, $D^5$ and $C^5$ each of which is pivotally connected at one end to its related shoe through toe extensions and at the other end to said fixed member. The piston ends of assemblies $B^5$ and $D^5$ are connected to their respective shoes, whereas on assembly $C^5$ the casing end is connected to its shoe and the piston end to said fixed member. The inlet hose 237 connects to the lower port of assembly $D^5$ the upper port of which is connected by flexible hose 238 to the lower port of assembly $C^5$ and the upper port of the latter is connected by flexible hose 239 to the lower port of assembly $B^5$, the upper port of the latter being a bleeding port normally closed.

Fig. 21 represents a modification of the embodiment shown in Figure 20 employing only two actuating assemblies to operate its three shoes, two frictionally assisted and the third frictionally opposed.

In this figure, $A^6$ is the brake drum within which are disposed assisted shoes 240 and 242 and opposed shoe 241, each being anchored or pivotally connected through suitable heel extensions or connections to a relatively fixed member (not shown).

Shoes 240 and 241 are operated by a common hydraulic actuating assembly B⁶ pivotally connected at one end to a toe connection or extension of shoe 240 and pivotally connected at the other end to a toe connection or extension of opposed shoe 241.

Shoe 242 is operated by the hydraulic actuating assembly D⁶ the casing end of which is pivotally connected to said shoe's toe extension or connection and the piston end of which is pivotally connected to said fixed member.

The inlet hose 243 connects to the lower port of assembly D⁶, the upper port of which is connected by flexible hose 244 to the lower port of assembly B⁶, the upper port of the latter being a bleeding port normally closed.

In Figs. 1, 16, 17, 18, 19, 20, and 21, it will be seen that each of the hydraulic actuating assemblies has an exit port at the highest point of the fluid containing space or chamber therein to facilitate the removal of air by the bleeding process and to avoid the confinement of air or the formation of air locks.

It is of course apparent that more than three shoes may be used, employing the same principle. The connections are desirably so arranged that the cylinder assemblies will function simultaneously.

Fig. 22 represents a hydraulic pressure source or supply tank and master cylinder for supplying hydraulic pressure to the actuating assemblies, such as F, the master cylinder itself being operated by compressed air.

In Fig. 22, 300 is a housing, the upper portion of which encompasses a liquid reservoir 320 and the lower portion a cylindrical bore 305. A removable vented filler plug 302 containing a deflector 304 is secured to the top of the housing 300, an interposed gasket 303 being provided to ensure a tight fit. The end of the reservoir 320 is closed by plug 301. The outer end of cylinder bore 305 is closed by end plug 309, a gasket 310 being disposed between the latter and the cylinder walls. Abutting the inner face of the gasket 310 is rubber valve seat 311 against the inner face of which normally rests the metal valve cage 312 containing annularly disposed holes 348 normally closed by the rubber valve cup 313.

Inserted in the cylinder bore is a substantially spool-shaped piston 314 the forward portion of which has annularly disposed liquid ports 315 normally closed by rubber piston cup 307 abutting the forward face of the piston and retained in place by spring 306 disposed between the piston cup 307 and the metal valve cage 312, the piston end of said spring resting in metal cup 308.

The spring 306 also serves as a loading spring for the valve assembly comprising the cage 312, the cup 313 and the seat 311. The rear portion of the piston 314 is provided with a secondary rubber sealing cup 318. The central portion of the piston 314 has a smaller diameter providing an annular liquid chamber communicating with the reservoir 320 through the port 346. A small compensating or by-pass port 347 is provided at the outer edge of cup 307 connecting the reservoir 320 with the forward part of the cylinder bore 305 when the piston 314, as shown, is in inoperative position.

In its inoperative position the rear face of the piston 314 abuts against the piston stop washer 319 retained in position by lock wire 345.

The housing 300 is provided with a projecting lug 322 for attachment to a frame member of the vehicle.

At its inner extremity, the housing 300 is provided with a circular flange 321 to provide for attachment thereto by annularly disposed bolts 325 and lock washers 326 of a corresponding flange 324 connected to the forward vented plate 323 (see vents 350) of a compressed air operated pressure means.

The flange 324 is also vented at 349 to provide a vent for the rear of cylinder bore 305. The rear or pressure plate 330 is secured to forward plate 323 by volts 334, nuts 328, and lock washers 329, annularly disposed about the rims 333 and 327 of such plates.

Disposed between these plates and likewise held in place by fastening assemblies 334, 328 and 329, is a diaphragm 335 which is shown in inoperative position. The annular fastenings 334, 328 and 329 are tight to prevent leakage of air. The rear plate 330 contains a raised portion providing an air duct 331 the lower end of which contains an entrance tap 332 for connection to a usual type of compressed air pressure source.

The forward surface of the diaphragm 335 rests against a circular push plate 336 which is securely attached to a push rod 317 which, in turn, connects with the piston 314 through recess 316. The push plate 336 and push rod 317 are normally held back in an inoperative position by spring 337 the forward end of which rests against the inner surface of the flange 324 and the rear end of which rests in a circular collar 338 which in turn abuts against the push plate. This arrangement also serves normally to hold the diaphragm back in an inoperative position.

The supply line tubing 340 is connected to the end plug 309 by swivel fitting 339 and communicates with the cylinder bore 305 through a suitable passage provided in end plug 309. Tubing 340 is connected to coupling 342 of flexible hose 343 by fitting 341. Hose 343, in turn, is connected by threaded coupling 344 to the inlet port extension 112³ of a wheel cylinder or hydraulic actuating assembly such as F, which has been described in greater detail hereinbefore. The upper port 113³ may be connected to another cylinder assembly, or, if used alone, may be plugged.

The operation of the pressure assembly is as follows:

To apply the brakes, compressed air is admitted, by a suitable controlling device, to duct 331 forcing the diaphragm forward which in turn through the push plate 336 and push rod 317 forces the piston 314 and cup 307 forward, thereby closing the compensating port 347 and forcing the liquid out of the bore 305 through the holes 348 of the valve cage 312 by forcing in the lips of the rubber valve cup 313 and out through the supply line 340 and hose 343 to the motor assembly F, expanding the same and thereby actuating the shoes into contact with the drum.

When the operating force on push rod 317 is released the brake shoe retractor springs compress the wheel cylinder assemblies (such as F) thereby forcing the fluid back to the master cylinder bore 305 by lifting the valve cage 312 off its seat 311. At the same time spring 306 forces the piston 314 back toward its inoperative position.

If the piston 314 is forced back more quickly than the fluid can be replaced from the supply lines to the forward end of master cylinder bore 305, the fluid pressure behind the front face of the piston 314 will be greater than the pressure in front permitting fluid to pass from the back to the front through piston ports 315 and around the edges of the rubber cup 307 to the front of the bore.

Any excess fluid thus introduced to the front of the bore 305 will automatically be returned to the reservoir 320 through compensating port 347 when the piston has reached the end of its return stroke.

Similarly, any volumetric excesses or deficiencies in the system due to expansion or contraction because of temperature, minor leaks, etc., are compensated for by the passage of fluid between the master cylinder bore 305 and the reservoir 320 through compensating port 347. Such volumetric excess need only be sufficient to lift the valve 312 from its seat, the load on the valve by the comparatively light spring 306 being only enough to maintain a slight positive pressure in the system to prevent the entrance of air.

In Figs. 23 and 24 H is a brake drum comprising a braking flange 400 and, securely attached thereto, a web 401 containing a central opening 402 and holes 403 for attachment to a wheel, hub, axle or other part of a vehicle or machine to be braked. A relatively fixed brake support member 404 containing central opening 405 and the brake backing plate 406 having central opening 407 are securely attached by bolts, rivets or suitable fasteners (not shown) to the axle housing, brake spider or other fixed part (not shown) through holes 408 and 409.

The two brake shoes 410 and 411 respectively have double, parallel stems or webs 412 and 413 as well as flanges or soles 414 and 415 to which latter are securely attached the lining or friction members 416 and 417 respectively. These shoes are both frictionally assisted or self-actuated in forward motion.

The heel ends of the double webs 412 and 413 straddle the support member (see Fig. 24) and are anchored or pivotally connected to such support member by anchor pins 418 and 419 respectively.

The hydraulically operated brake shoe actuating assemblies F and G are pivotally connected at one end to the support member by the same pins 418 and 419, whereby the shoes 410 and 411 are anchored. At the other ends, these assemblies F and G are pivotally connected to the respective shoes 411 and 410 by pins 421 and 420 passing through the webs 413 and 412 of said shoes.

The two retractor springs 422 and 423 are connected at one end to the support member by pins 424 and 425 and at the other ends to their respective shoes by pins 426 and 427 passing through webs 412 and 413

Motor assembly F has been described in sufficient detail hereinabove (see Figs. 13, 14 and 15). Since the parts of motor assemblies F and G are similar and identical in construction, they are referred to by similar reference numbers, except that for assembly F these reference numbers contain the superior numeral "3" and for assembly G the reference numbers contain the superior numeral "4." Moreover, assemblies F and G are interchangeable. The parts of motor assembly G will therefore be understandable by referring to the description for motor assembly F above.

It will be seen that on motor assembly G (see Fig. 23) the casing eyed attachment lugs $95^4$ are pivotally attached to the support member 404 by pin 419 passing through the eyes and support member, and the eyed attachment lugs $104^4$ are pivotally connected to the shoe 410 by pin 420 passing through these eyes and the webs 412 of the shoe. On motor assembly F, however, the relative position is reversed, the casing eyed attachment lugs $95^3$ being pivotally connected to the shoe 411 by pin 421 passing through these eyes and the webs 413 of the shoe, and the eyed attachment lugs $104^3$ being pivotally connected to the support member 404 by pin 418 passing through these eyes and the support member.

Thus, on assembly G the cylinder or casing end is connected to the fixed support and the piston end to the shoe whereas on assembly F the piston end is connected to the fixed support and the cylinder or casing end to the shoe.

The purpose of this arrangement is to provide in each motor assembly a port at the highest part of each cylinder fluid chamber, regardless of the motion of the assemblies occasioned by operation or use of the brake, in order to facilitate the removal of air and to prevent the confining of air or the formation of air locks.

By referring to Fig. 23 it will be seen that the axis of each of the assemblies F and G is horizontal so that the ports $111^3$ and $111^4$ will be at the highest parts of their respective cylinders regardless of the direction in which the assemblies are connected. This figure, however, shows the brake both in a fully retracted position and before it has been subjected to any use or wear. It will be apparent that when the brakes are applied and particularly as the lining wears through usage, the shoe end of motor assembly G will move down whereas the shoe end of motor assembly F will move up due to the geometrical constraint under which the shoes 410 and 411 move about their respective pivot axes. The more the shoes wear, the greater would become the deviation from the horizontal of the motor assembly axes. If the piston end of assembly F were connected to the shoe 411 an air pocket could readily form during the process of bleeding the air from the fluid system since the upper port would no longer be at the highest point of the liquid chambers, thus preventing the removal of all the air from the system. By connecting the assembly F in the manner indicated in Fig. 23, the removal of air is assured and facilitated.

The motor assembly port extensions $113^3$, $113^3$, $112^4$ and $113^4$ (see Figs. 14 and 24) protrude through openings provided in the backing plate 406 (see Fig. 24). Rubber dust caps 428 fit over the protruding portions of these extensions and cover the backing plate holes to prevent the entrance of foreign matter.

A liquid supply hose 436 leading from the master cylinder is connected to the lower port $110^3$ of assembly F. The flexible hose 432 connects the upper port $111^3$ of assembly F with the lower port $110^4$ of assembly G (see Fig. 23). Suitable fittings and fitting bolts are provided as shown by fitting 429 and bolt 435 in Fig. 24. The upper port of assembly G is normally closed by the threaded bleeder plug 433 passing through the dummy fitting 430. This plug is loosened during the bleeding process at which time the dust screw 434 is removed and a bleeder hose inserted. The fitting spacer block 431 serves to prevent the fittings 429 and 430 from turning.

In operation, the air must first be bled from the system and the bleeding plug closed. To actuate the brake, additional liquid under pressure from a master cylinder or other liquid pressure source is introduced through a suitable hose or conduit, such as 436, into assembly F through port 110³ and at the same time to assembly G through connecting hose 432. This liquid under pressure expands the double cylinder-piston combinations of each of these assemblies against the restraining effect of retractor springs 422 and 423 thereby actuating the shoes 410 and 411 into contact with the drum. When the pressure is released, the retractor springs compress the assemblies F and G forcing the excess liquid back to its source and at the same time withdrawing the shoes from contact with the drum.

In the embodiments portrayed in Figures 1, 16, 17, 18, 19 and 23 wherein all the shoes are self-actuated in forward motion, the reverse braking torque can be increased, thereby providing a more equitable ratio between forward and reverse torques, by decreasing the coefficient of friction of the linings and at the same time by increasing the pedal stroke or the mechanical advantage thereby providing greater actuating force.

Increasing the mechanical advantage or pedal stroke is feasible in this type of brake due to the exceptionally long lining life and the infrequency of adjustments for wear which make it unnecessary to conserve the pedal stroke to as great a degree as in other types. The present application is a continuation in part of application Serial No. 71,636, filed March 30, 1936, now Patent No. 2,171,585, issued September 5, 1939.

It is to be understood that many alternative and varying constructions may be made pursuant to the broad aspects of the present invention, as above pointed out, and it is intended to cover and include all such alternatives and variations as come within the scope of the appended claims.

What is claimed is:

1. An internal friction brake having a rotatable brake drum, a plurality of brake shoes therein, at least three in number, having frictional contact surfaces operating in substantially the same circumferential path, said shoes each being actuated by a liquid pressure operated motor assembly having a piston and a cylinder, at least one of said assemblies having an axis substantially removed from the horizontal and another of said assemblies having an axis substantially removed from the vertical, said assemblies each being provided with a liquid chamber formed between the piston and the cylinder and spaced separate inlet and outlet ports connected to said chamber, at least one of the ports of each assembly being always at the highest point of the liquid chamber of the assembly during all positions of the assembly upon operation of the shoes and upon wear of the frictional contact surfaces, and conduits connecting the ports of different cylinders so that the liquid will course through them from one assembly to the other.

2. An internal friction brake having a rotatable brake drum, a plurality of brake shoes therein, at least three in number, having friction linings operating in substantially the same circumferential path, said shoes each being actuated by a liquid pressure operated motor assembly having a piston and a cylinder, at least one of said assemblies having an axis substantially removed from the horizontal and another of said assemblies having an axis substantially removed from the vertical, said assemblies each being provided with a liquid chamber formed between the piston and the cylinder and spaced separate inlet and outlet ports connected to said chamber, at least one of said ports of each assembly being at the highest point of the liquid chamber of its respective assembly throughout operation of the shoes and wear of the friction linings, and conduits connecting the ports of different cylinders so that the liquid will course through them from a lower assembly to a higher assembly, each of said motor assemblies being interchangeable.

3. An internal friction brake having a rotatable brake drum, a relatively fixed support within said drum, a plurality of brake shoes, at least three in number, operatively associated with said fixed support and positioned successively in substantially the same circumferential path for frictional engagement with said drum, said shoes each being actuated by a liquid pressure operated motor assembly having a piston and a cylinder, at least one of said assemblies having an axis substantially removed from the horizontal and another of said assemblies having an axis substantially removed from the vertical, said assemblies each being provided with a liquid chamber formed between the piston and the cylinder and spaced, separate inlet and outlet ports connected to said chamber, at least one of the ports of each assembly being connected to the uppermost part of the liquid chamber of the assembly, and a conduit connecting a port of each assembly with a port of another assembly so that the liquid will course through the chambers of all the assemblies, the cylinder of at least one motor assembly being connected to the shoe actuated by said assembly.

4. A friction brake having a rotatable brake drum, a relatively fixed part, a brake shoe operatively associated with said fixed part for frictional engagement with said brake drum, and a liquid pressure operated motor assembly operatively associated with and for operating said brake shoe, said motor assembly being pivotally connected to said fixed part and comprising a cylinder and a piston therein, said piston having an extension sleeve and a link rod carried in and sliding in said sleeve, and said cylinder having secured and fixed thereto a cap having a bearing for said sleeve.

5. An internal friction brake having a rotatable brake drum, a plurality of brake shoes therein, at least three in number, for engaging said drum in substantially the same circumferential path, said shoes each being actuated by a liquid pressure operated motor assembly having a piston and a cylinder, at least one of said assemblies having an axis substantially removed from the horizontal and another of said assemblies having an axis substantially removed from the vertical, said assemblies each being provided with a liquid chamber formed between the piston and the cylinder and spaced separate inlet and outlet ports connected to said chamber, at least one of each of said ports being connected to the highest part of the liquid chamber of each assembly, and conduits connecting the ports of the assemblies so that the liquid will course through all the assemblies, each of said pistons having an extension sleeve and a link rod carried in said sleeve, and each said cylinder being provided with a cap having a bearing for said sleeve.

6. A friction brake having a rotatable brake drum, a relatively fixed support, a brake shoe for frictional engagement with said drum and operatively associated with said support, and a liquid pressure operated motor assembly operatively associated with and for operating said brake shoe, said motor assembly comprising a casing having a cylindrical bore, an open end and a closed end, a pair of fluid ports adjacent said closed end, an attachment eye connected to the closed end of said casing, a piston coaxial with said bore for reciprocal motion therein, a sealing cup against the inner face of said piston, means for maintaining said cup against said piston, a piston rod of substantially smaller diameter than said piston connected with said piston, a metallic bearing and cover cap attached to said casing adjacent its open end to enclose the open end of said casing, said cap having an opening of substantially the same size as the piston rod to receive and guide said rod and to serve as a support and bearing therefor, a cylindrical bore within said piston rod having an opening at its end away from the piston, a link rod extending into said piston rod bore for reciprocal motion in and out of said bore, and an attachment eye connected to said link rod adjacent its end away from the piston, one of said attachment eyes being pivotally connected to said shoe and the other attachment eye being pivotally connected to said support.

7. A friction brake having a rotatable brake drum, a relatively fixed support, at least three brake shoes operatively associated with said fixed support and having contact surfaces for frictional engagement with said drum, and a liquid pressure operated motor assembly for each of said shoes for operating said shoes, each of said motor assemblies having a hollow outer casing, a closed end and an open end, two fluid ports, a connecting lug attached to the closed end of said casing, a piston for reciprocal motion within said casing, and an attachment lug associated with said piston, the casing attachment lug on at least one motor assembly being connected to said fixed support, the casing attachment lug on at least one other motor assembly being connected to one of said shoes, the piston lug on at least one motor assembly being connected to said fixed support and the piston lug of at least one motor assembly being connected to another of said shoes.

8. A friction brake having a rotatable brake drum, a relatively fixed part within said drum, three brake shoes operatively associated with said fixed part and having contact surfaces for frictional engagement with said brake drum, three fluid operated motors, one for each of said shoes, for actuating said shoes into engagement with said drum, each of said motors including a cylinder closed at one end, two fluid ports communicating with said cylinder adjacent said closed end, and a piston within said cylinder for reciprocal motion therein, each of said motors being connected to a brake shoe and to said fixed part, the cylinders of two of said motors being connected to said fixed part and the pistons thereof being connected with the respective shoes operated by said motors, and the cylinder of the third motor being connected to the brake shoe operated by said motor and the piston thereof being connected with said fixed part, and means for operating said motors simultaneously.

9. A friction brake having a rotatable brake drum, a relatively fixed part within said drum, three brake shoes operatively associated with said fixed part and having contact surfaces for frictional engagement with said brake drum, three liquid pressure operated motors, one for each of said shoes, for actuating said shoes into engagement with said drum, each of said motors including a cylinder closed at one end, two fluid ports communicating with said cylinder adjacent said closed end, and a piston within said cylinder for reciprocal motion therein, each of said motors being connected to a brake shoe and to said fixed part, the cylinders of two of said motors being connected to the respective brake shoes operated by the motors and the pistons thereof being connected with said fixed part, and on the third motor the piston being connected with the brake shoe operated by such motor and the cylinder being connected to said fixed part, and means for operating said motors simultaneously.

10. In a friction brake, in combination, a rotatable brake drum, a brake shoe for frictional engagement with said drum, and a liquid pressure operated motor assembly for actuating said shoe into contact with said drum, said motor assembly comprising a casing having a plurality of parallel cylindrical bores, an open end and a closed end, a pair of fluid ports adjacent said closed end, each port communicating with all of said bores, an attachment lug connected to said casing, a piston within each of said bores for reciprocal motion therein, a sealing cup against the inner face of each of said pistons, means for maintaining each of said cups in position, a piston rod connected to each of said pistons, each of said piston rods being of substantially smaller diameter than its related piston, metallic bearing and cover means connected to said casing adjacent its open end, said means having openings of substantially the same size as the piston rods to receive and guide said rods and to serve as supports and bearings therefor, a cylindrical bore within each of said piston rods, each such bore having an opening at its end away from the piston, a link rod extending into each of said piston rod bores for sliding motion in and out of said bores, and an attachment lug connected to each of said link rods adjacent the ends of said rods away from the pistons.

11. A friction brake comprising a rotatable brake drum, a relatively fixed support, at least three brake shoes operatively associated with said support and having contact surfaces in substantially the same circumferential path for engagement with said drum, said shoes each being actuated by a liquid pressure operated motor assembly, each assembly having a piston and a cylinder, at least one of said assemblies having an axis substantially removed from the horizontal and another of said assemblies having an axis substantially removed from the vertical, said assemblies each being provided with a liquid chamber formed between the piston and the cylinder and spaced separate inlet and outlet ports connected to said chamber, at least one of the ports of each assembly being at the uppermost part of the liquid chamber, the piston of at least one assembly being connected to one brake shoe and the cylinder of at least one assembly being connected to another brake shoe, and means connecting the assemblies to operate them simultaneously.

12. A friction brake having a brake drum, a support within said drum, at least three brake shoes operatively associated with said support and having contact surfaces to engage said drum, and a plurality of liquid pressure operated cylinder-piston combinations for operating said shoes, each of said combinations having an axis, the axis of at least one combination being at a substantial angle to the axis of at least one other combination, each combination having a liquid chamber and a fluid port at substantially the highest part of said chamber, the piston of at least one combination being connected to said support and the cylinder of at least one other combination being connected to said support, and means to operate said combinations simultaneously.

13. In a friction brake, in combination, a rotatable brake drum, a relatively fixed part within said drum, at least three brake shoes operatively associated with said fixed part and having contact surfaces to engage said drum in substantially the same circumferential path, a plurality of liquid pressure operated cylinder-piston combinations for operating said shoes, at least one of said combinations having an axis substantially removed from the vertical and another of said combinations having an axis substantially removed from the horizontal, each combination having a liquid chamber and a fluid port connected to the highest part of said chamber, the piston of at least one combination being connected to said fixed part and the cylinder of at least one combination being connected to one of said shoes, and means to operate said combinations simultaneously.

14. An internal friction brake having a rotatable brake drum, a relatively fixed part within said drum, a plurality of brake shoes operatively associated with said fixed part and having contact surfaces in substantially the same circumferential path to engage the interior of said drum, and a plurality of liquid pressure operated motor assemblies, one for each shoe, for operating said shoes, said assemblies each having a piston and a cylinder closed at one end and a liquid chamber formed between the piston and the closed end of the cylinder, each of said cylinders having spaced separate fluid ports adjacent the closed end and connecting with said chamber, at least one of said ports in each of said cylinders being at substantially the highest part of said chamber, the cylinder and the piston of each assembly each being provided with a pivotal connection, the cylinder of at least one assembly being pivotally connected to a brake shoe and the piston of the same assembly being pivotally connected to said fixed part, and the piston of at least one assembly being pivotally connected to another brake shoe and the cylinder of said last mentioned assembly being pivotally connected to said fixed part.

15. A friction brake having a brake drum, a brake shoe for frictional engagement with said drum, and a liquid pressure operated motor within said drum for operating said shoe, said motor comprising a cylinder closed at one end, a piston within said cylinder, a sealing cup against said piston, means for maintaining said cup in position, a liquid chamber within said cylinder between said sealing cup and the closed end of said cylinder, a pair of spaced, separate liquid ports communicating with said chamber, a rigid bearing cap securely attached and fixed to said cylinder opposite its closed end, said cap having a bearing, a piston rod of substantially smaller diameter than said piston connected with said piston, said piston rod being carried in and sliding in said bearing of said cap, said piston rod and said cylinder each being provided with a pivotal connecting means, one of said pivotal connecting means being connected to said brake shoe.

16. An internal friction brake having a rotatable brake drum, a relatively fixed part, a plurality of brake shoes for frictional engagement with said drum, and a plurality of liquid pressure operated motor assemblies, one for each shoe, for operating said shoes, said assemblies each having a piston and a cylinder, each assembly also having two connecting means, one operatively associated with the cylinder and one operatively associated with the piston, on at least one of said motor assemblies the connecting means associated with the piston being pivotally connected with one of said shoes, and on at least one other of said motor assemblies the connecting means associated with the piston being pivotally connected to said fixed part, each of said assemblies also having a liquid chamber and a fluid port at the highest point of said chamber, the chambers of all assemblies being in fluid communication.

17. An internal friction brake having a rotatable brake drum, a relatively fixed part, a plurality of brake shoes for frictional engagement with said drum, and a plurality of liquid pressure operated motors, one for each shoe, for operating said shoes, said motors each having a piston and a cylinder, each motor also having two connecting means, one operatively associated with the cylinder and one operatively associated with the piston, on at least one of said motors the connecting means associated with the cylinder being pivotally connected to one of said shoes, and on at least one other of said motors the connecting means associated with the piston being pivotally connected with another of said shoes, each of said motors also having a liquid chamber and a fluid port at the highest point of said chamber, the chambers of all motors being in fluid communication.

18. An internal friction brake having a rotatable brake drum, a relatively fixed part, a plurality of brake shoes for frictional engagement with said drum, and a plurality of liquid pressure operated motor assemblies, one for each shoe, for operating said shoes, said assemblies each having a piston and a cylinder, each assembly also having two connecting means, one operatively associated with the cylinder and one operatively associated with the piston, on at least one of said motor assemblies the connecting means associated with the cylinder being pivotally connected to said fixed part, and on at least one other of said motor assemblies the connecting means associated with the piston being pivotally connected to said fixed part, each of said assemblies also having a liquid chamber and a fluid port at the highest point of said chamber, the chambers of all assemblies being in fluid communication.

19. An internal friction brake having a rotatable brake drum, a relatively fixed part, a plurality of brake shoes for frictional engagement with said drum, and a plurality of liquid pressure operated motor assemblies, one for each shoe, for operating said shoes, said assemblies each having a piston and a cylinder, each assembly also having two connecting means, one operatively associated with the cylinder and one operatively associated with the piston, on at least one of said motor assemblies the connecting means associated with the cylinder being pivotally connected to one of said shoes and the connecting means associated with the piston being pivotally connected to said fixed part, and on at least one other of said motor assemblies the connecting means associated with said cylinder being pivotally connected to said fixed part and the connecting means associated with the piston being pivotally connected to another of said shoes, each of said assemblies also having a liquid chamber and a fluid port at the highest point of said chamber, the chambers of all assemblies being in fluid communication.

20. A friction brake having a rotatable brake drum, a friction member for frictional engagement with said brake drum, a reaction member within said brake drum, and a liquid pressure operated motor operatively associated with and for operating said friction member into frictional contact with said drum, said motor comprising a casing having two cylindrical bores with parallel axes arranged side by side, a pair of fluid ports, each port communicating with both of said bores, connecting means operatively associated with said casing, a piston within each of said bores for reciprocal motion therein, and additional connecting means operatively associated with said pistons, one of said connecting means being operatively connected to said friction member and the other connecting means being operatively connected to said reaction member.

GUSTAV MATTERSDORF.